US009597760B1

(12) United States Patent
Nishida et al.

(10) Patent No.: US 9,597,760 B1
(45) Date of Patent: Mar. 21, 2017

(54) TABLE CLAMP DEVICE AND PALLET CHANGER

(71) Applicant: Yamazaki Mazak Corporation, Niwa-gun (JP)

(72) Inventors: Kiyoshi Nishida, Niwa-gun (JP); Kazuhiro Maki, Niwa-gun (JP); Kotaro Nasu, Niwa-gun (JP)

(73) Assignee: YAMAZAKI MAZAK CORPORATION, Aichi (JP)

( * ) Notice: Subject to any disclaimer, the term of this patent is extended or adjusted under 35 U.S.C. 154(b) by 0 days.

(21) Appl. No.: 15/170,944

(22) Filed: Jun. 2, 2016

Related U.S. Application Data

(63) Continuation of application No. PCT/JP2015/074667, filed on Aug. 31, 2015.

(51) Int. Cl.
*B23Q 7/02* (2006.01)
*B23Q 7/14* (2006.01)

(52) U.S. Cl.
CPC .............. *B23Q 7/02* (2013.01); *B23Q 7/1431* (2013.01); *B65G 2203/0233* (2013.01)

(58) Field of Classification Search
CPC .......... B23Q 7/02; B23Q 7/1431; B23Q 3/12; B23Q 3/152; B23Q 2203/0233
USPC ............................................ 198/345.1–345.3
See application file for complete search history.

(56) References Cited

U.S. PATENT DOCUMENTS

| | | | | |
|---|---|---|---|---|
| 3,647,043 A | * | 3/1972 | Garetto | B23Q 39/042 198/345.3 |
| 4,257,513 A | * | 3/1981 | Siarto | B23Q 1/522 198/345.3 |
| 4,678,077 A | * | 7/1987 | Bertorello | B23Q 1/0018 198/345.3 |
| 4,917,226 A | * | 4/1990 | Blocker | B65G 15/12 198/345.1 |
| 5,002,175 A | * | 3/1991 | Drexel | B23Q 1/03 198/345.3 |
| 5,143,196 A | * | 9/1992 | Henn | B24B 9/102 198/345.3 |
| 5,467,861 A | * | 11/1995 | Weskamp | B23P 21/004 198/345.3 |

(Continued)

FOREIGN PATENT DOCUMENTS

| | | |
|---|---|---|
| CN | 102837189 | 12/2012 |
| JP | 05-318261 | 12/1993 |

(Continued)

OTHER PUBLICATIONS

Chinese Office Action for corresponding CN Application No. 201580001854.4, Oct. 10, 2016 (w/ English machine translation).

(Continued)

*Primary Examiner* — Mark A Deuble
(74) *Attorney, Agent, or Firm* — Mori & Ward, LLP

(57) ABSTRACT

A table clamp device includes a reference rail, a slider section, and a movement mechanism. The reference rail is provided on a mounting surface of a base on which a rotary table is rotatably supported. The rotary table has a first engagement part. The slider section is provided to slide along the reference rail and has a second engagement part. The movement mechanism moves the slider section along the reference rail so that the second engagement part engages with the first engagement part such that the rotary table is positioned and clamped to the base.

15 Claims, 17 Drawing Sheets

(56) References Cited

U.S. PATENT DOCUMENTS

| | | | |
|---|---|---|---|
| 5,579,695 A | * | 12/1996 | Cockayne ............... B23Q 1/28 104/106 |
| 7,213,315 B2 | | 5/2007 | Hansch et al. |
| 2006/0287174 A1 | | 12/2006 | Hansch et al. |
| 2012/0325061 A1 | | 12/2012 | Liao et al. |

FOREIGN PATENT DOCUMENTS

| | | |
|---|---|---|
| JP | 07-040180 | 2/1995 |
| JP | 10-6168 | 1/1998 |
| JP | 10-235532 | 9/1998 |
| JP | 2002-137136 | 5/2002 |

OTHER PUBLICATIONS

International Search Report for corresponding International Application No. PCT/JP2015/074667, Oct. 27, 2015.
Written Opinion for corresponding International Application No. PCT/JP2015/074667, Oct. 27, 2015.

* cited by examiner

TABLE CLAMP DEVICE AND PALLET CHANGER

CROSS-REFERENCE TO RELATED APPLICATIONS

The present application is a continuation application of International Application No. PCT/JP2015/074667, filed Aug. 31, 2015. The contents of this application are incorporated herein by reference in their entirety.

BACKGROUND OF THE INVENTION

Field of the Invention

The present invention relates to a table clamp device and a pallet changer.

Discussion of the Background

Conventionally, there is known a pallet changer that holds out/pulls in or exchanges, between a machining position and a setup position of a machine tool, a pallet on which a workpiece is mounted, by rotation around a predetermined rotary shaft.

As typical examples of the structure of such a pallet changer, those described in Japanese Unexamined Patent Application Publication No. 2002-137136 and Japanese Unexamined Patent Application Publication No. 07-040180 are known.

A pallet exchange device described in Japanese Unexamined Patent Application Publication No. 2002-137136 includes a rotary table that rotates 180 degrees between a machining position and a setup position of a machine tool, two pallets disposed on the rotary table, clamp blocks provided on lower surfaces, of the rotary table, where the two pallets are mounted, and clamp bases provided at the machining position and the setup position, respectively.

Moreover, the pallet exchange device of Japanese Unexamined Patent Application Publication No. 2002-137136 is configured such that, when one of the pallets is disposed at the machining position, a positioning pin protrudes from the clamp base at the machining position into the clamp block to perform positioning, and also such that a claw member of the clamp base presses and fixes the clamp block in a manner of pressing down.

A pallet support device described in Japanese Unexamined Patent Application Publication No. 07-040180 includes a rotary arm that rotates between a changeover board and a pallet rotation mechanism provided at a machining position and that moves up and down, a clamp device provided to the pallet rotation mechanism, a tapered socket formed on a lower surface of a pallet supported by the rotary arm, a pull stud protruding at the center of the tapered socket, a tapered cone formed on an upper surface of the clamp device, and an insertion hole formed at the center of the tapered cone.

Furthermore, the pallet support device of Japanese Unexamined Patent Application Publication No. 07-040180 is configured such that the pallet is positioned by the clamp device by the tapered socket being engaged with the tapered cone according to the vertical movement of the rotary arm, and also such that the pull stud protruding from the tapered socket is inserted and fixed in the insertion hole of the tapered cone, and solid clamping is thereby achieved.

SUMMARY OF THE INVENTION

According to a first aspect of the present invention, a table clamp device for positioning and clamping a rotary table that rotates between a plurality of positions at a predetermined position with respect to a base that supports the rotary table in a manner capable of rotating, the table clamp device includes a reference rail, a slider section, and a movement mechanism. The reference rail is attached to a mounting surface of the base. The slider section is attached in a manner capable of moving along the reference rail. The movement mechanism moves the slider section on the reference rail. The rotary table is positioned and clamped to the base by the slider section by engagement of the slider section with a part of the rotary table.

According to a second aspect of the present invention, a table clamp device includes a reference rail, a slider section, and a movement mechanism. The reference rail is provided on a mounting surface of a base on which a rotary table is rotatably supported. The rotary table has a first engagement part. The slider section is provided to slide along the reference rail and has a second engagement part. The movement mechanism moves the slider section along the reference rail so that the second engagement part engages with the first engagement part such that the rotary table is positioned and clamped to the base.

According to a third aspect of the present invention, a pallet changer includes a rotary table, a driver, a base, and a table clamp device. The rotary table has a first engagement part. The driver rotates the rotary table. The base includes a rotary shaft around which the rotary table rotates. The table clamp device includes a reference rail, a slider section, and a movement mechanism. The reference rail is provided on a mounting surface of the base. The slider section is provided to slide along the reference rail and has a second engagement part. The movement mechanism moves the slider section along the reference rail so that the second engagement part engages with the first engagement part such that the rotary table is positioned and clamped to the base.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1A:
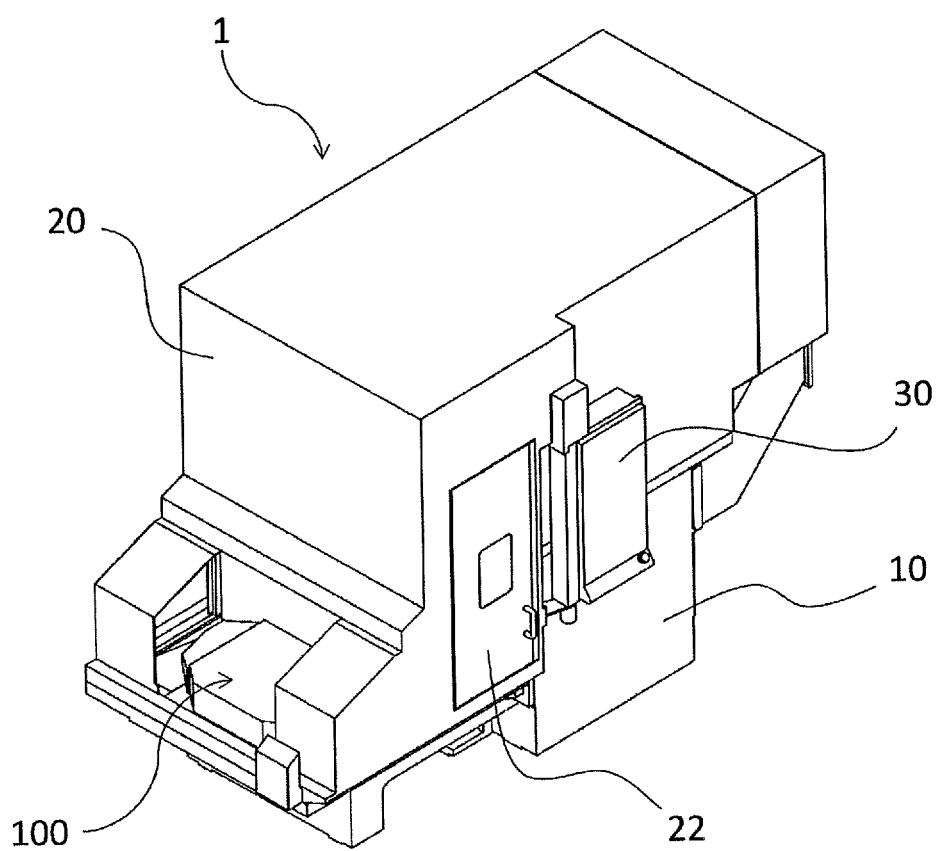
FIG. 1A is a perspective view showing a machine tool including a pallet changer that uses a table clamp device according to a first embodiment of the present invention, and shows an outer appearance including a cover.

The embodiments will now be described with reference to the accompanying drawings, wherein like reference numerals designate corresponding or identical elements throughout the various drawings.

First Embodiment

An overview of a table clamp device according to a first embodiment of the present invention will be described with reference to FIGS. 1 to 3.

Figure 1B:
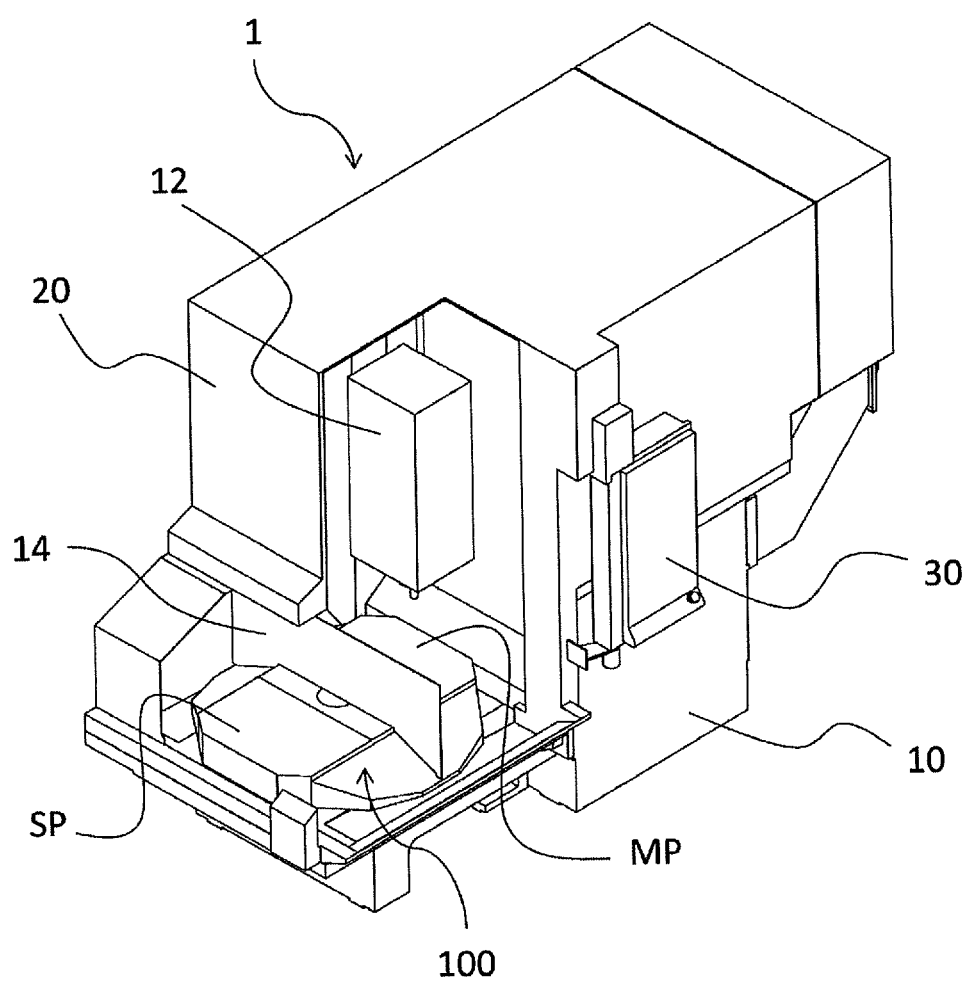
FIG. 1B is a perspective view showing the machine tool including the pallet changer that uses the table clamp device according to the first embodiment of the present invention, and shows the inside by cutting away a part of the cover.

FIG. 1 are perspective views showing a machine tool including a pallet changer that uses a table clamp device according to the first embodiment of the present invention, and FIG. 1A shows an outer appearance including a cover, and FIG. 1B shows the inside by cutting away a part of the cover.

As shown in FIG. 1A, a machine tool 1 including a pallet changer that uses the table clamp device according to the first embodiment of the present invention is a vertical machining center, for example, and includes a main body 10, a cover 20, a man-machine interface 30, and a pallet changer 100.

As shown in FIG. 1B, the main body 10 of the machine tool 1 includes a machining head 12 which is capable of moving in each of XYZ directions with respect to a workpiece in a state where a milling tool is attached, for example, and a partition plate 14 for separating a machining position MP where the machining head 12 is disposed and a setup position SP outside the cover 20.

The cover 20 includes a door 22 to allow an operator to work inside the cover 20, and the man-machine interface 30 is disposed near the door 22.

Also, the cover 20 has a shape according to which the machining position MP is a machining area of the machine tool 1 and the setup position SP is a setup area of the machine tool 1 with the partition plate 14 serving as the boundary.

The man-machine interface 30 includes a control device for controlling the operation of the entire machine tool 1, an input device for an operator to input machining conditions and the like regarding machining control to be performed by the control device, and a display device for displaying, to the operator, machining conditions, detection results of various sensors, and the like.

The pallet changer 100 for moving a pallet between the machining position MP and the setup position SP and for exchanging the pallet is attached to the main body 10 of the machine tool 1.

The pallet changer 100 includes a rotary table, described later, that rotates around a rotary shaft, and a pallet mounted on the rotary table is moved between the machining position MP and the setup position SP by the rotary table rotating by 180 degrees.

Figure 2A:
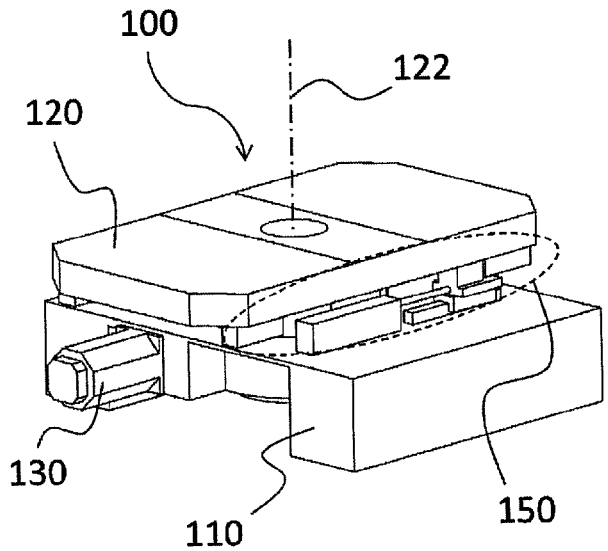
FIG. 2A is a diagram showing an overview of the pallet changer that uses the table clamp device according to the first embodiment of the present invention, and shows a perspective view of the entire pallet changer.
Figure 2B:
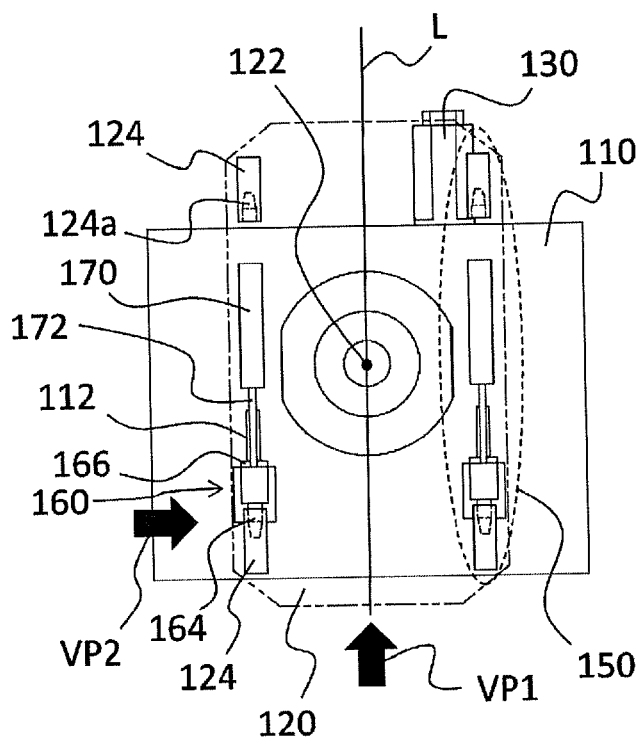
FIG. 2B is a diagram showing an overview of the pallet changer that uses the table clamp device according to the first embodiment of the present invention, and shows a top view of the pallet changer.
Figure 2C:
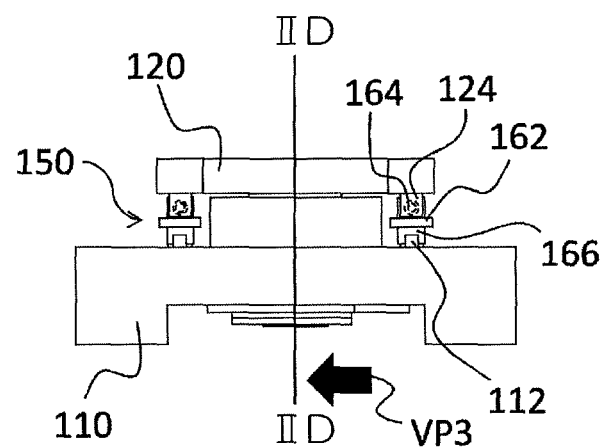
FIG. 2C is a diagram showing an overview of the pallet changer that uses the table clamp device according to the first embodiment of the present invention, and shows a side view of the pallet changer seen from the direction of an arrow VP1 in FIG. 2B.
Figure 2D:
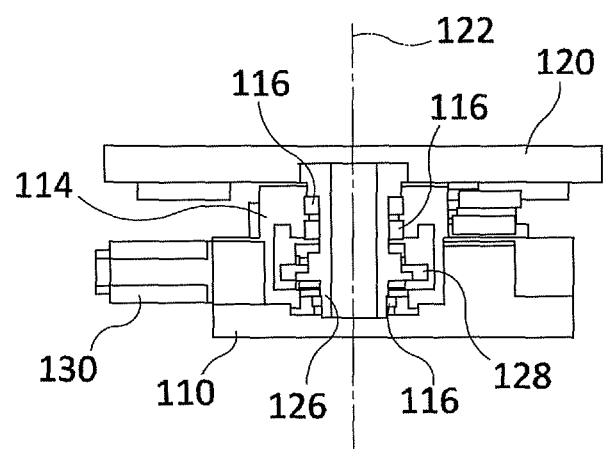
FIG. 2D is a diagram showing an overview of the pallet changer that uses the table clamp device according to the first embodiment of the present invention, and shows a cross-sectional view of the pallet changer along a cross section IID-IID in FIG. 2C seen from the direction of an arrow VP3.
Figure 2E:
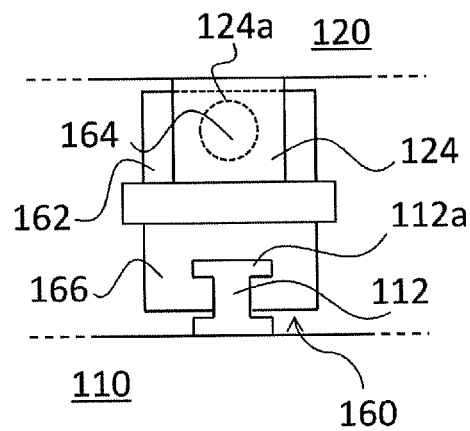
FIG. 2E is a diagram showing an overview of the pallet changer that uses the table clamp device according to the first embodiment of the present invention, and shows an enlarged view of main parts around the table clamp device in FIG. 2C.
Figure 2F:
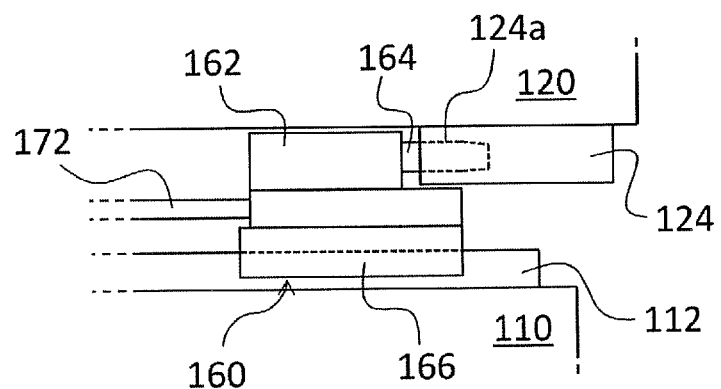
FIG. 2F is a diagram showing an overview of the pallet changer that uses the table clamp device according to the first embodiment of the present invention, and shows a side view of main parts of the table clamp device seen from the direction of an arrow VP2 in FIG. 2B.

FIG. 2 are diagrams showing an overview of the pallet changer that uses the table clamp device according to the first embodiment of the present invention, and FIG. 2A shows a perspective view of the entire pallet changer, FIG. 2B shows a top view of the pallet changer, FIG. 2C shows a side view of the pallet changer seen from the direction of an arrow VP1 in FIG. 2B, FIG. 2D shows a cross-sectional view of the pallet changer along a cross section IID-IID in FIG. 2C seen from the direction of an arrow VP3, FIG. 2E shows an enlarged view of main parts around the table clamp device in FIG. 2C, and FIG. 2F shows a side view of main parts of the table clamp device seen from the direction of an arrow VP2 in FIG. 2B.

Additionally, in FIG. 2B, the rotary table is shown by a two-dot chain line, and an overview of the table clamp device seen through the rotary table from above is shown together.

As shown in FIG. 2A, the pallet changer 100 that uses the table clamp device according to the first embodiment of the present invention includes a base 110, a rotary table 120 that rotates around a rotary shaft 122, a rotation motor 130, and table clamp devices 150 for positioning and clamping the rotary table 120 with respect to the base 110.

For example, the rotary table 120 has a substantially rectangular shape, as shown in FIG. 2B, and a pallet (not shown) on which a workpiece is mounted is attached near each short side across the rotary shaft 122. Also, a cylindrical shaft member 126 is fixed at the center portion of one surface of the rotary table 120 (see FIG. 2D).

As shown in FIG. 2D, an accommodation section 114 whose inner surface is cylindrical is formed to the base 110, and the shaft member 126 fixed to the rotary table 120 is received via a plurality of bearings 116 provided on the inner surface of the accommodation section 114.

Furthermore, a transmission mechanism (not shown) including a gear mechanism for transmitting rotation force from an output shaft of the rotation motor 130 is further provided to the base 110, near the accommodation section 114.

On the other hand, a gear 128 is formed in a circumferential direction on an outer surface of the shaft member 126 fixed to the rotary table 120. The gear 128 is coupled with the output shaft of the rotation motor 130 by the transmission mechanism mentioned above.

According to such a structure, the rotation force from the output shaft of the rotation motor 130 is transmitted to the gear 128 by the transmission mechanism and the shaft member 126 is rotated in the forward or reverse direction to thereby cause the rotary table 120 to rotate.

Also, rotation of the rotation motor 130 is NC controlled by the control device provided to the man-machine interface 30 shown in FIG. 1, and the rotation position (rotation angle) of the rotary table 120 may be freely controlled.

As shown in FIGS. 2B and 2C, the pallet changer 100 according to the first embodiment includes the table clamp devices 150 at positions that are line-symmetrical across a line that is parallel to the long side of the rotary table 120 and that passes through the rotary shaft 122 on the base 110 (that is, near the long sides of the rotary table 120 positioned at the machining position MP).

The table clamp device 150 includes a reference rail 112 attached to a mounting surface of the base 110 (in this case, the "mounting surface" of the base 110 is defined as a "surface of the base 110 which is parallel to the surface of the rotary table 120 where a workpiece is to be mounted and which is a surface on the rotary table 120 side"), positioning blocks 124 attached on a facing surface of the rotary table 120 (in this case, the "facing surface" of the rotary table 120 is defined as a "surface of the rotary table 120 which faces the mounting surface of the base 110"), a slider section 160 that moves on the reference rail 112, and a movement mechanism 170 for moving the slider section 160.

The reference rails 112 are attached, on the mounting surface of the base 110, one each at a position corresponding to one of the long sides of the rotary table 120 positioned at the machining position MP, in parallel to the long side.

On the other hand, regarding the positioning blocks 124, two sets of positioning blocks 124 are attached on the facing surface of the rotary table 120, the sets being near corners on the diagonal lines of the rotary table 120.

Accordingly, as shown in FIG. 2B, four positioning blocks 124 are disposed at the corners of the facing surface of the rotary table 120.

A positioning hole 124a for being fitted with a positioning pin 164 of the slider section 160 described later is formed to each of the four positioning blocks 124.

Also, two positioning blocks 124 facing each other along the long side of the rotary table 120 are disposed in parallel to the reference rail 112 and with the positioning holes 124a facing each other.

According to such a structure, when the rotary table 120 is rotated 180 degrees, the positioning blocks 124 that are disposed on the diagonal lines are disposed in such a manner that the positioning holes 124a formed to the positioning blocks 124 always face the slider sections 160 on the reference rails 112.

As shown in FIGS. 2E and 2F, the slider section 160 is formed from a support section 162, the positioning pin 164 formed protruding from the side surface of the support section 162, and a reference slider 166 attached to the lower surface of the support section 162 (the surface facing the mounting surface of the base 110).

When seen in FIGS. 2E and 2F, the positioning pin 164 is formed protruding from the side surface of the support section 162 in parallel to the reference rail 112 in both the top-down direction and the left-right direction, and its tip end is tapered.

Furthermore, as shown in FIG. 2E, a wide head section 112a is formed at the upper end of the reference rail 112, and the reference slider 166 is formed to surround the head section 112a of the reference rail 112.

Moreover, the reference slider 166 is astride the reference rail 112 in a manner capable of freely sliding in the longitudinal direction, and thus the reference slider 166 is capable of moving along the reference rail 112 without rocking in the left-right direction or the top-down direction in FIG. 2E.

Accordingly, the reference slider 166 also functions to fix the reference rail 112 in the left-right direction and the top-down direction in FIG. 2E.

The movement mechanism 170 is configured by means having a drive section which is capable of linearly expanding and contracting, such as a hydraulic cylinder, and is disposed on the same straight line as the reference rail 112, as shown in FIG. 2A or 2B.

Furthermore, the movement mechanism 170 includes an arm 172 which is capable of freely moving forward and backward with respect to the movement mechanism 170, and the arm 172 is attached on a side surface of the slider section 160 opposite the surface where the positioning pin 164 is attached, and moves the slider section 160 forward and backward on the reference rail 112.

Figure 3A:
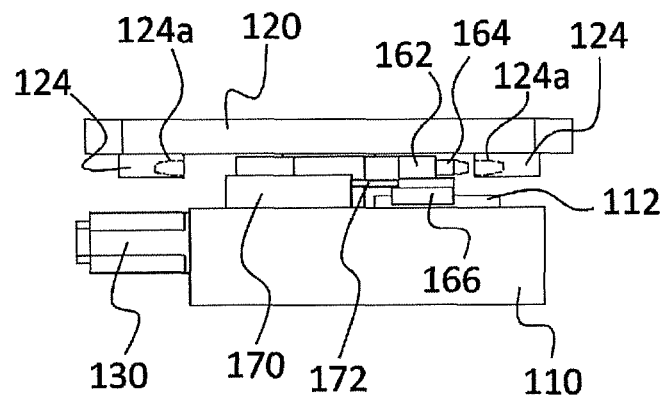
FIG. 3A is a side view showing an overview of a positioning and clamping operation of the pallet changer that uses the table clamp device according to the first embodiment of the present invention, and shows an unclamped state.
Figure 3B:
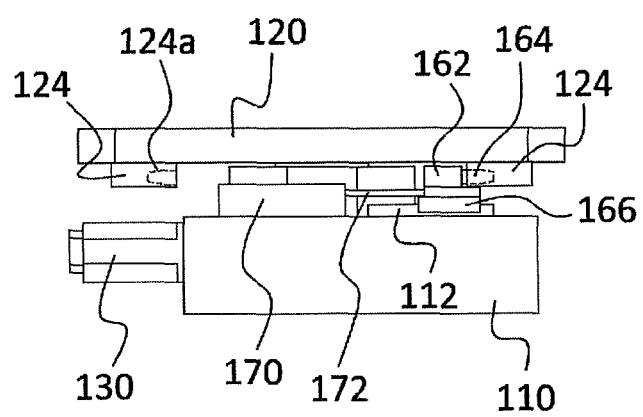
FIG. 3B is a side view showing an overview of the positioning and clamping operation of the pallet changer that uses the table clamp device according to the first embodiment of the present invention, and shows a clamped state.

FIG. 3 are side views showing an overview of a positioning and clamping operation of the pallet changer that uses the table clamp device according to the first embodiment of the present invention, and FIG. 3A shows an unclamped state, and FIG. 3B shows a clamped state.

With the table clamp device according to the first embodiment, a state as shown in FIG. 3A where the positioning block 124 attached to the facing surface of the rotary table 120 and the slider section 160 are not coupled together is taken as an "unclamped" state, and a state as shown in FIG. 3B where the positioning pin 164 of the slider section 160 is inserted and coupled with the positioning hole 124a of the positioning block 124 is taken as a "clamped" state.

In the unclamped state shown in FIG. 3A, the arm 172 of the movement mechanism 170 contracts and moves the slider section 160 to the left side in the drawing. At this time, the positioning pin 164 of the slider section 160 is separated from the positioning hole 124a of the positioning block 124 attached to the rotary table 120, and coupling between the two is released.

When the rotation motor 130 is driven in this state, the rotary table 120 is allowed to rotate around the rotary shaft 122.

When the rotary table 120 is rotated, and the positioning block 124 and the reference rail 112 are placed at positions coinciding in the left-right direction when seen from above, driving of the rotation motor 130 is stopped, and rotating of the rotary table 120 is stopped.

The arm 172 of the movement mechanism 170 is extended in this state, and the slider section 160 is moved to the right in the drawing. Then, the positioning pin 164 protruding from the support section 162 of the slider section 160 moves toward the positioning hole 124a of the facing positioning block 124, and the positioning pin 164 is inserted into the positioning hole 124a and a coupled state is achieved.

As shown in FIG. 3B, when the positioning pin 164 of the slider section 160 and the positioning hole 124a of the positioning block 124 are coupled, the positioning block 124 and the slider section 160 integrally move in the rotation direction of the rotary table 120.

As described above, the slider section 160 engages with the reference rail 112 via the reference slider 166 without rocking in the left-right direction, and as a result, the rotary table 120 and the base 110 are positioned with respect to the rotation direction of the rotary table 120.

Furthermore, when the positioning pin 164 formed to the support section 162 of the slider section 160 is inserted and coupled with the positioning hole 124a formed to the positioning block 124 of the rotary table 120, the positions of the rotary table 120 and the slider section 160 are fixed with respect to the top-down direction in FIG. 3B, for example.

On the other hand, as described above, the reference rail 112 attached to the base 110 and the reference slider 166 of the slider section 160 are engaged with the head section 112a of the reference rail 112 being surrounded by the reference slider 166, and thus the positions in the top-down direction are fixed.

Accordingly, when the positioning pin 164 of the slider section 160 and the positioning hole 124a of the positioning block 124 are coupled together, the base 110 and the rotary table 120 are positioned in the rotation direction and are clamped in the top-down direction.

As described above, according to the table clamp device 150 according to the first embodiment of the present invention shown in FIGS. 1 to 3, positioning and clamping of the base 110 and the rotary table 120 are performed by the slider section 160 disposed between the two, and driving operations for clamping and unclamping by the slider section 160 are performed by the movement mechanism 170 provided on the base 110, and thus there is no need to provide separate means for driving a positioning mechanism and a clamping mechanism, as in the case of a conventional device, and also there is no need to adopt a structure for vertically moving the rotary table.

Accordingly, structures of the rotary mechanism of the rotary table and the positioning/clamping mechanism of the rotary table may be made simple.

Furthermore, according to the pallet changer 100 adopting the table clamp device 150 according to the first embodiment of the present invention, positioning and clamping of the base 110 and the rotary table 120 are performed by an operation of rotating the rotary table 120 and then coupling the slider section 160 that moves on the reference rail 112 attached to the mounting surface of the base 110 with the positioning block 124 attached to the facing surface of the rotary table 120.

Accordingly, positioning and clamping of the base 110 and the rotary table 120 may be performed by one step of moving the slider section 160 that moves on the reference rail 112, and thus the time necessary for positioning and clamping of the base 110 and the rotary table 120 may be reduced.

Second Embodiment

Next, an overview of a table clamp device according to a second embodiment of the present invention will be described with reference to FIGS. 4 to 6.

A mode of realizing coupling between a rotary table and a slider section by a positioning pin and a positioning hole is described with respect to the table clamp device according to the first embodiment, but with respect to a table clamp device according to the second embodiment, a case of realizing coupling between a rotary table and a slider section by a following rail attached to the rotary table and a following slider of the slider section will be described.

Additionally, a machine tool according to the second embodiment, to which the table clamp device and the pallet changer are applied, is the same as the one described in the first embodiment and shown in FIG. 1, and repeated description thereof is omitted.

Figure 4A:
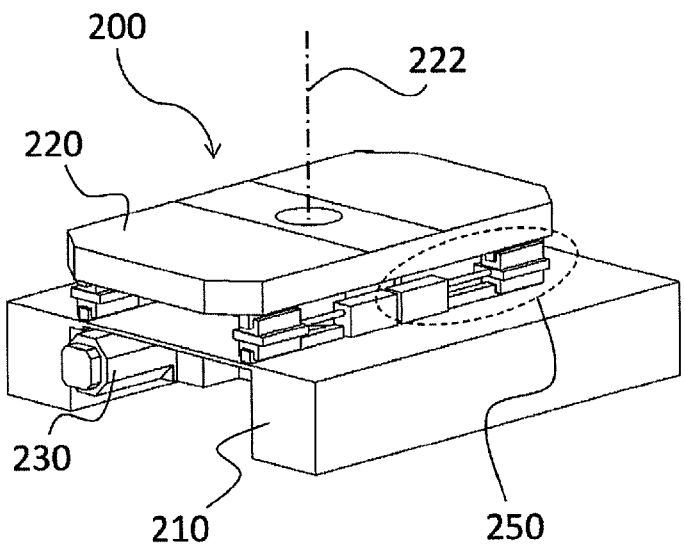
FIG. 4A is a diagram showing an overview of a pallet changer that uses a table clamp device according to a second embodiment of the present invention, and shows a perspective view of the entire pallet changer.
Figure 4B:
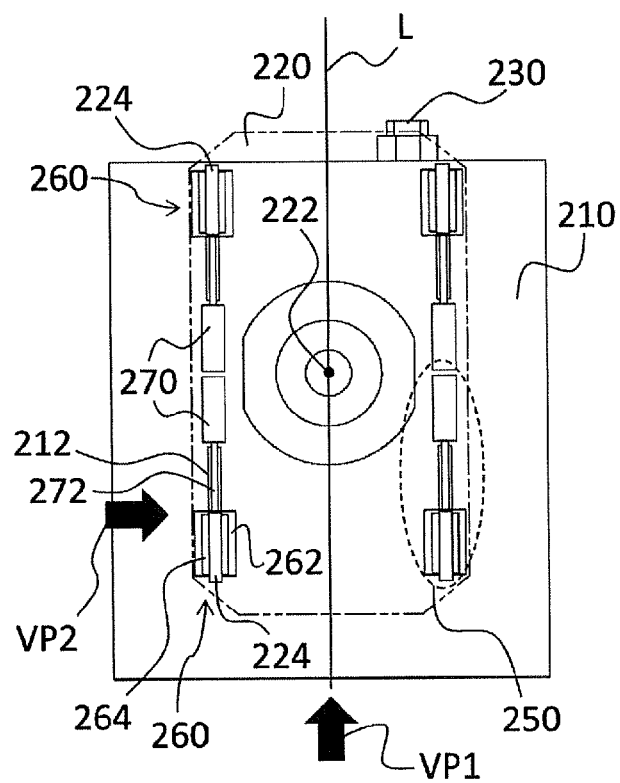
FIG. 4B is a diagram showing an overview of the pallet changer that uses the table clamp device according to the second embodiment of the present invention, and shows a top view of the pallet changer.
Figure 4C:
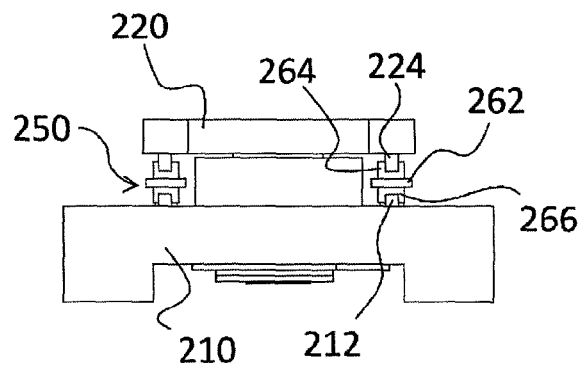
FIG. 4C is a diagram showing an overview of the pallet changer that uses the table clamp device according to the second embodiment of the present invention, and shows a side view of the pallet changer seen from the direction of an arrow VP1 in FIG. 4B.
Figure 4D:
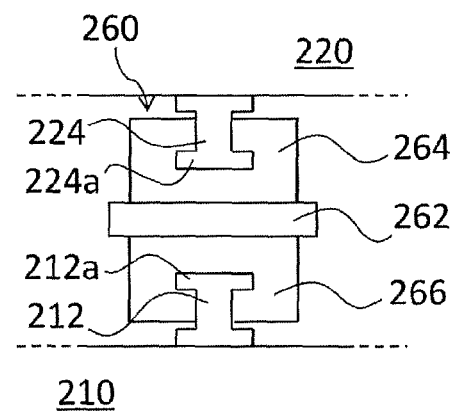
FIG. 4D is a diagram showing an overview of the pallet changer that uses the table clamp device according to the second embodiment of the present invention, and shows an enlarged view of main parts around the table clamp device in FIG. 4C.
Figure 4E:
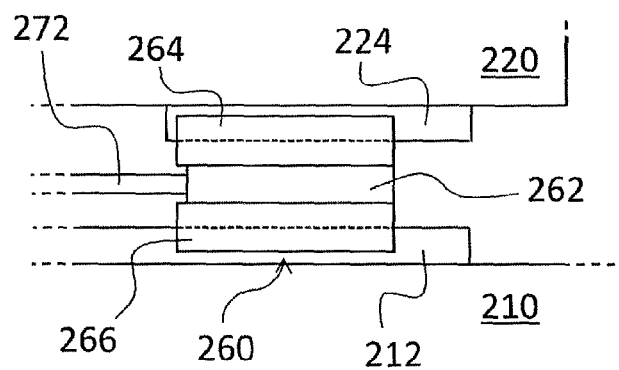
FIG. 4E is a diagram showing an overview of the pallet changer that uses the table clamp device according to the second embodiment of the present invention, and shows a side view of main parts of the table clamp device seen from the direction of an arrow VP2 in FIG. 4B.

FIG. 4 are diagrams showing an overview of a pallet changer that uses a table clamp device according to the second embodiment of the present invention, and FIG. 4A shows a perspective view of the entire pallet changer, FIG. 4B shows a top view of the pallet changer, FIG. 4C shows a side view of the pallet changer seen from the direction of an arrow VP1 in FIG. 4B, FIG. 4D shows an enlarged view of main parts around the table clamp device in FIG. 4C, and FIG. 4E shows a side view of main parts of the table clamp device seen from the direction of an arrow VP2 in FIG. 4B.

Additionally, also in FIG. 4B, the rotary table is shown by a two-dot chain line, and an overview of the table clamp device seen through the rotary table from above is shown together.

As shown in FIG. 4A, a pallet changer 200 that uses the table clamp device according to the second embodiment of the present invention includes a base 210, a rotary table 220 that rotates around a rotary shaft 222, a rotation motor 230, and table clamp devices 250 for positioning and clamping the rotary table 220 with respect to the base 210.

Additionally, with the pallet changer 200 according to the second embodiment, the structures of the base 210, the rotary table 220, the rotation motor 230, and the mechanism for rotating the rotary table 220 are the same as those of the first embodiment shown in FIG. 2, and repeated description thereof is omitted.

As shown in FIGS. 4B and 4C, the pallet changer 200 according to the second embodiment includes the table clamp devices 250 on the base 210, near positions corresponding to the four corners of the rotary table 220.

The table clamp device 250 includes a reference rail 212 attached to a mounting surface of the base 210 (the same as the "mounting surface" in the first embodiment), a following rail 224 attached to a facing surface of the rotary table 220 (the same as the "facing surface" in the first embodiment), a slider section 260 that moves on the reference rail 212, and a movement mechanism 270 for moving the slider section 260 along the reference rail 212.

The reference rails 212 are attached, on the mounting surface of the base 210, one each at a position corresponding to one of the long sides of the rotary table 220 positioned at the machining position MP (positions that are line-symmetrical across a straight line L passing through the center of the rotary shaft 222), in parallel to the long side and from one of four corners of the rotary table 220.

In the same manner, the following rails 224 are attached, on the facing surface of the rotary table 220, one each at a position corresponding to one of the long sides of the rotary table 220, in parallel to the long side and from one of four corners of the rotary table 220.

As described above, four reference rails 212 are attached to the base 210, and four following rails 224 are attached to the rotary table 220.

Moreover, both of the reference rail 212 and the following rail 224 are in parallel to the long side of the rotary table 220 positioned at the machining position MP, and when the rotary table 220 is rotated 180 degrees, the following rail 224 attached to the facing surface of the rotary table 220 is disposed in parallel to and on the same straight line, when seen from above as shown in FIG. 4B, as the reference rail 212 attached to the mounting surface of the base 210.

As shown in FIGS. 4D and 4E, the slider section 260 is formed from a support section 262, a following slider 264 attached to the upper surface of the support section 262 (the surface facing the surface of the rotary table 220 where the following rails 224 are attached), and a reference slider 266 attached to the lower surface of the support section 262 (the surface facing the mounting surface of the base 210).

Furthermore, as shown in FIG. 4D, a wide head section 212*a* is formed at the upper end of the reference rail 212, and a wide head section 224*a* is formed at the lower end of the following rail 224.

As in the first embodiment, the reference slider 266 is formed to surround the head section 212*a* of the reference rail 212.

In the same manner, the following slider 264 is formed to surround the head section 224*a* of the following rail 224, and in a state where the following rail 224 is inserted in a recessed groove of the following slider 264, the following slider 264 is capable of freely sliding in the longitudinal direction of the following rail 224.

According to these structures, in a state where the following rail 224 is inserted in the recessed groove of the following slider 264, the following slider 264 is allowed to move along the following rail 224 without rocking in the left-right direction and the top-down direction in FIG. 4D.

At this time, the following slider 264 also functions to fix the rotary table 220 to which the following rail 224 is attached, in the left-right direction and the top-down direction in FIG. 4D.

As in the case of the first embodiment, the movement mechanism 270 is configured by means having a drive section which is capable of linearly expanding and contracting, such as a hydraulic cylinder, and is disposed on the same straight line as the reference rail 212, as shown in FIG. 4A or 4B.

Furthermore, the movement mechanism 270 includes an arm 272 which is capable of freely moving forward and backward with respect to the movement mechanism 270, and the arm 272 is attached to the support section 262 of the slider section 260, and moves the slider section 260 forward and backward on the reference rail 212.

Figure 5A:
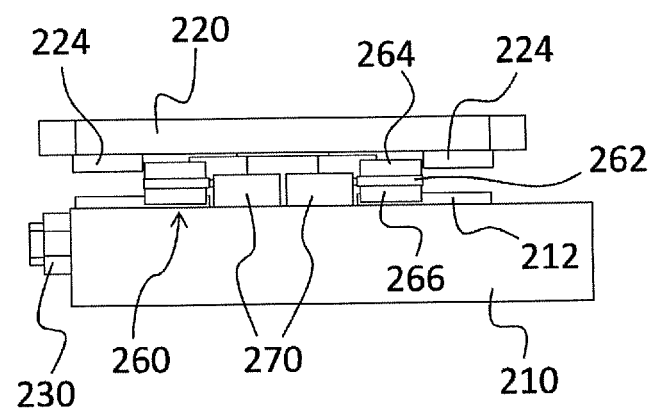
FIG. 5A is a side view showing an overview of a positioning and clamping operation of the pallet changer that uses the table clamp device according to the second embodiment of the present invention, and shows an unclamped state.
Figure 5B:
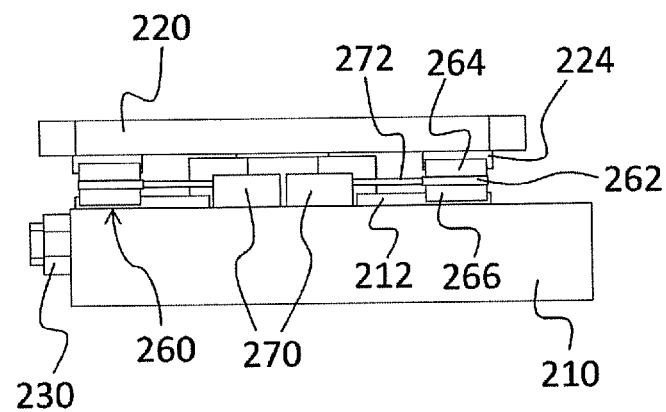
FIG. 5B is a side view showing an overview of the positioning and clamping operation of the pallet changer that uses the table clamp device according to the second embodiment of the present invention, and shows a clamped state.

FIG. 5 are side views showing an overview of a positioning and clamping operation of the pallet changer that uses the table clamp device according to the second embodiment of the present invention, and FIG. 5A shows an unclamped state, and FIG. 5B shows a clamped state.

With the table clamp device according to the second embodiment, a state as shown in FIG. 5A where the following rail 224 attached to the facing surface of the rotary table 220 and the following slider 264 of the slider section 260 are not coupled together is taken as an "unclamped" state, and a state as shown in FIG. 5B where the following rail 224 is inserted and coupled with the following slider 264 of the slider section 260 is taken as a "clamped" state.

In the unclamped state shown in FIG. 5A, the arm 272 of the movement mechanism 270 contracts and moves the slider section 260 in the direction of coming close to the movement mechanism 270. At this time, the following slider 264 of the slider section 260 is separated from the following rail 224 attached to the rotary table 220, and coupling between the two is released.

When the rotation motor 230 is driven in this state, the rotary table 220 is allowed to rotate around the rotary shaft 222.

When the rotary table 220 is rotated, and the following rail 224 and the reference rail 212 reach positions that are on the same straight line when seen from above, driving of the rotation motor 230 is stopped, and rotating of the rotary table 220 is stopped.

The arm 272 of the movement mechanism 270 is extended in this state, and the slider section 260 is moved in the direction of separating from the movement mechanism 270. Then, the following slider 264 of the slider section 260 moves toward the facing following rail 224, and the following rail 224 is inserted into the recessed groove of the following slider 264 and a coupled state is achieved.

As shown in FIG. 5B, when the following slider 264 of the slider section 260 and the following rail 224 attached to the rotary table 220 are coupled, the rotary table 220 and the slider section 260 integrally move in the rotation direction of the rotary table 220 by the following slider 264 and the following rail 224.

As described above, the slider section 260 engages with the reference rail 212 via the reference slider 266 without rocking in the left-right direction, and as a result, the rotary table 220 and the base 210 are positioned with respect to the rotation direction of the rotary table 220.

Furthermore, when the following rail 224 of the rotary table 220 is inserted and coupled with the following slider 264 of the slider section 260, the positions of the rotary table 220 and the slider section 260 are fixed with respect to the top-down direction.

On the other hand, as described above, the positions of the reference rail 212 attached to the base 210 and the reference slider 266 of the slider section 260 are fixed in the top-down direction.

Accordingly, when the following rail 224 of the rotary table 220 and the following slider 264 of the slider section 260 are coupled together, the base 210 and the rotary table 220 are positioned in the rotation direction and are clamped in the top-down direction.

As described above, according to the table clamp device 250 according to the second embodiment of the present invention shown in FIGS. 4 and 5, as in the case of the first embodiment, the structures of a rotary mechanism of the rotary table 220 and a positioning/clamping mechanism of the rotary table 220 may be simplified, and also the time necessary for positioning and clamping of the base 210 and the rotary table 220 may be reduced.

Furthermore, coupling between the rotary table 220 and the slider section 260 is performed by the following rail 224 attached to the facing surface of the rotary table 220 and the following slider 264 of the slider section 260, and thus, compared to the case of coupling of the positioning pin and the positioning hole in the first embodiment, the following rail 224 and the following slider 264 are engaged in a manner capable of freely sliding, and bumping, in the rotation direction, of the rotary table 220 on the sliding surface is suppressed, and the accuracy of positioning of the rotary table 220 in the rotation direction with respect to the base 210 may be improved.

Furthermore, the contact on the sliding surface is increased and the following rail 224 becomes less likely to fall out from the following slider 264, and also, bumping in the top-down direction is suppressed, and as a result, coupling between the rotary table 220 and the slider section 260 may be made strong.

Additionally, the pallet changer that uses the table clamp device 250 according to the second embodiment of the present invention may be modified in the following manner.

Figure 6A:
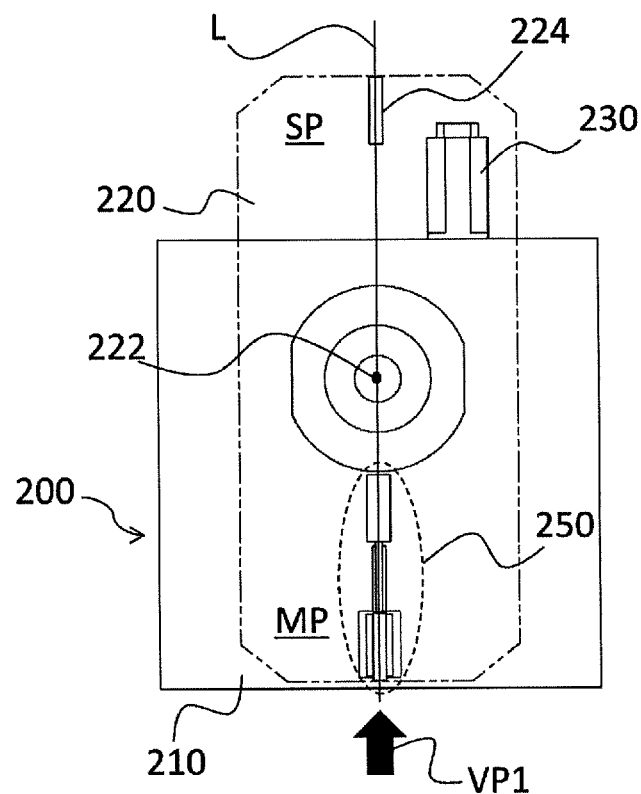
FIG. 6A is a diagram showing an overview of a first example modification of the pallet changer that uses the table clamp device according to the second embodiment of the present invention, and shows a top view of the pallet changer.
Figure 6B:
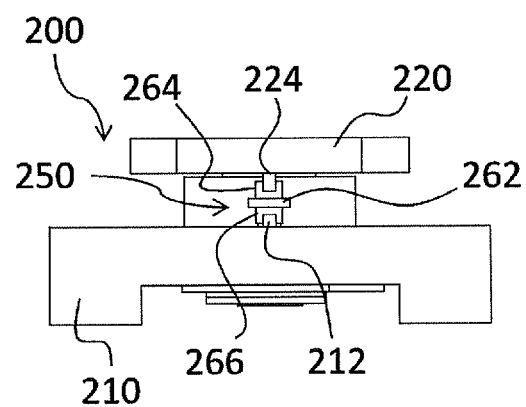
FIG. 6B is a diagram showing an overview of the first example modification of the pallet changer that uses the table clamp device according to the second embodiment of the present invention, and shows a side view of the pallet changer seen from the direction of an arrow VP1 in FIG. 6A.

FIG. 6 are diagrams showing an overview of a first example modification of the pallet changer that uses the table clamp device according to the second embodiment of the present invention, and FIG. 6A shows a top view of the pallet changer, and FIG. 6B shows a side view of the pallet changer seen from the direction of an arrow VP1 in FIG. 6A.

Figure 7A:
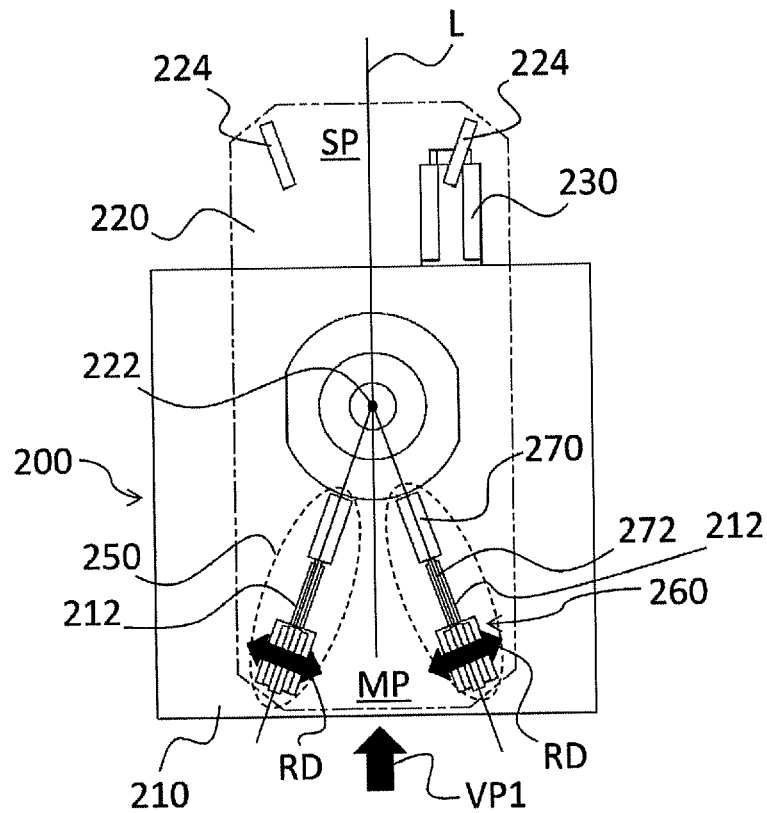
FIG. 7A is a diagram showing an overview of a second example modification of the pallet changer that uses the table clamp device according to the second embodiment of the present invention, and shows a top view of the pallet changer.
Figure 7B:
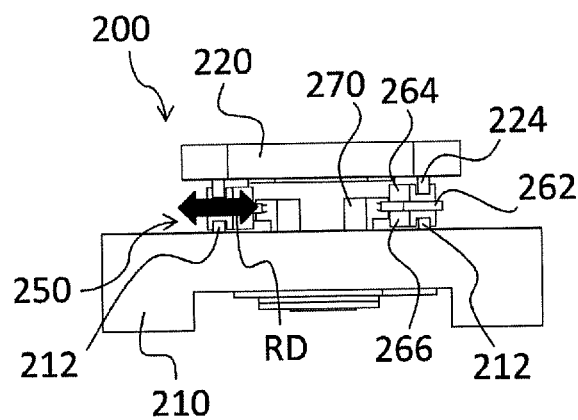
FIG. 7B is a diagram showing an overview of the second example modification of the pallet changer that uses the table clamp device according to the second embodiment, and shows a side view of the pallet changer seen from the direction of an arrow VP1 in FIG. 7A.

Also, FIG. 7 are diagrams showing an overview of a second example modification of the pallet changer that uses the table clamp device according to the second embodiment of the present invention, and FIG. 7A shows a top view of the pallet changer, and FIG. 7B shows a side view of the pallet changer seen from the direction of an arrow VP1 in FIG. 7A.

As shown in FIGS. 6A and 6B, the pallet changer 200 according to a first example modification of the second embodiment includes one table clamp device 250 on a straight line L which is parallel to the long side of the rotary table 220 that is positioned at the machining position MP and which passes through the rotary shaft 222 of the rotary table 220.

One reference rail 212 is attached to the mounting surface of the base 210, on the same straight line as the straight line L.

On the other hand, one following rail 224 is attached on the facing surface of the rotary table 220, at each position near the short side of the rotary table 220, on the same line as the straight line L and in parallel to the straight line L.

According to such a structure, every time the rotary table 220 rotates 180 degrees, the slider section 260 of the table clamp device 250 faces the corresponding following rail 224, and the positioning and the clamping described above may be efficiently performed by one table clamp device 250, and the structure of the pallet changer 200 may be even more simplified.

On the other hand, as shown in FIGS. 7A and 7B, the pallet changer 200 according to a second example modification of the second embodiment includes two table clamp devices 250 radially positioned with respect to the rotating radial direction, toward the corners from the rotary shaft 222 of the rotary table 220.

Two reference rails 212 are attached to the mounting surface of the base 210, at positions radial with respect to the rotating radial direction toward the corners from the rotary shaft 222 of the rotary table 220, the reference rails being line-symmetrical across the straight line L passing through the rotary shaft 222.

Furthermore, four following rails 224 are provided on the facing surface of the rotary table 220, at positions radial with respect to the rotating radial direction toward the four corners from the rotary shaft 222 of the rotary table 220.

According to such a structure, every time the rotary table 220 rotates 180 degrees, the slider section 260 of the table clamp device 250 faces the corresponding following rail 224, and thus the positioning and clamping described above may be efficiently performed, and shifting of the position of the rotary table 220 with respect to a rotating direction RD (a so-called "rocking" state) may be directly suppressed by the slider section 260, and furthermore, a load transmitted to the movement mechanism 270 of the table clamp device 250 through the arm 272 due to an impact in the rotating direction occurring at the time of machining or positioning, for example, may be reduced.

Additionally, when considering the load or the like on a workpiece from the machining head 12 of the machine tool 1 shown in FIG. 1, the table clamp device 250 is preferably disposed on the machining position MP side, as shown in FIG. 7A.

Third Embodiment

Next, an overview of a table clamp device according to a third embodiment of the present invention will be described with reference to FIGS. 8 and 9.

A mode of realizing coupling between a rotary table and a slider section by a following rail and a following slider is described with respect to the table clamp device according to the second embodiment, but with respect to a table clamp device according to the third embodiment, a case where a standby rail for holding the following slider at the time of unclamping is provided in addition to the structures of the following rail and the following slider will be described.

Additionally, also in the third embodiment, a machine tool to which the table clamp device and the pallet changer are applied is the same as the one described in the first embodiment and shown in FIG. 1, and repeated description thereof is omitted.

Figure 8A:
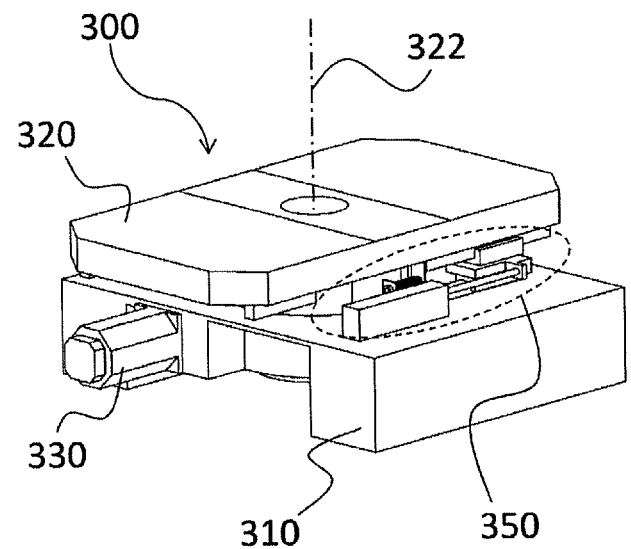
FIG. 8A is a diagram showing an overview of a pallet changer that uses a table clamp device according to a third embodiment of the present invention, and shows a perspective view of the entire pallet changer.
Figure 8B:
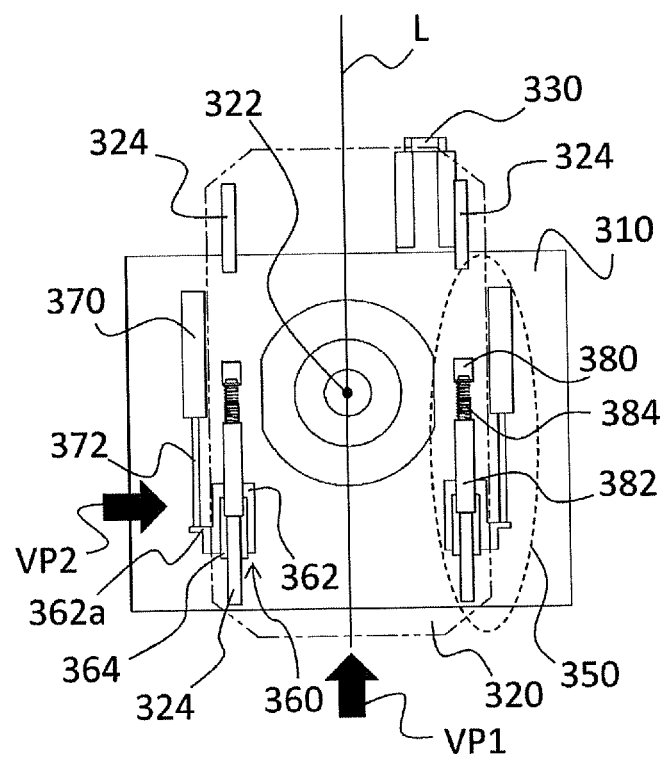
FIG. 8B is a diagram showing an overview of the pallet changer that uses the table clamp device according to the third embodiment of the present invention, and shows a top view of the pallet changer.
Figure 8C:
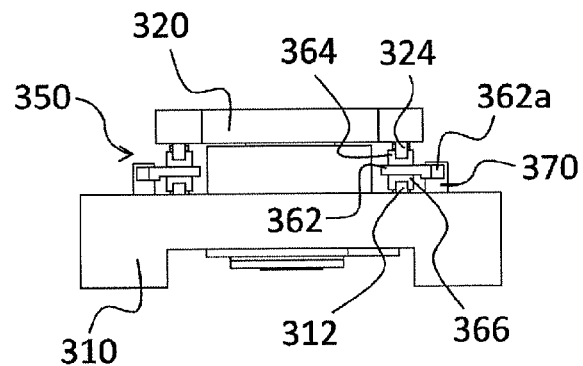
FIG. 8C is a diagram showing an overview of the pallet changer that uses the table clamp device according to the third embodiment of the present invention, and shows a side view of the pallet changer seen from the direction of an arrow VP1 in FIG. 8B.
Figure 8D:
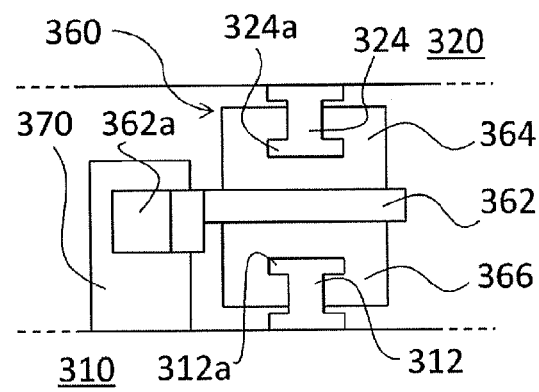
FIG. 8D is a diagram showing an overview of the pallet changer that uses the table clamp device according to the third embodiment of the present invention, and shows an enlarged view of main parts around the table clamp device in FIG. 8C.
Figure 8E:
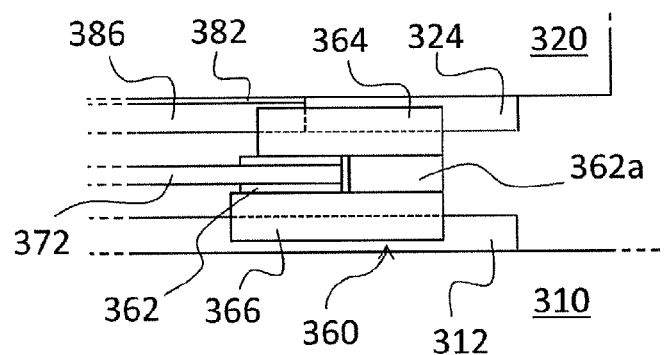
FIG. 8E is a diagram showing an overview of the pallet changer that uses the table clamp device according to the third embodiment of the present invention, and shows a side view of main parts of the table clamp device seen from the direction of an arrow VP2 in FIG. 8B.

FIG. 8 are diagrams showing an overview of a pallet changer that uses a table clamp device according to the third embodiment of the present invention, and FIG. 8A shows a perspective view of the entire pallet changer, FIG. 8B shows a top view of the pallet changer, FIG. 8C shows a side view of the pallet changer seen from the direction of an arrow VP1 in FIG. 8B, FIG. 8D shows an enlarged view of main parts around the table clamp device in FIG. 8C, and FIG. 8E shows a side view of main parts of the table clamp device seen from the direction of an arrow VP2 in FIG. 8B.

Additionally, also in FIG. 8B, the rotary table is shown by a two-dot chain line, and an overview of the table clamp device seen through the rotary table from above is shown together.

As shown in FIG. 8A, a pallet changer 300 that uses the table clamp device according to the third embodiment of the present invention includes a base 310, a rotary table 320 that rotates around a rotary shaft 322, a rotation motor 330, and table clamp devices 350 for positioning and clamping the rotary table 320 with respect to the base 310.

Additionally, with the pallet changer 300 according to the third embodiment, the structures of the base 310, the rotary table 320, the rotation motor 330, and the mechanism for rotating the rotary table 320 are the same as those of the first embodiment shown in FIG. 2, and repeated description thereof is omitted.

As shown in FIGS. 8B and 8C, the pallet changer 300 according to the third embodiment includes, as in the case of the first embodiment, the table clamp devices 350 at positions that are line-symmetrical across a line that is parallel to the long side of the rotary table 320 and that passes through the rotary shaft 322 on the base 310 (that is, near the long sides of the rotary table 320 positioned at the machining position MP).

The table clamp device 350 includes a reference rail 312 attached to a mounting surface of the base 310 (the same as the "mounting surface" in the first embodiment), following rails 324 attached to a facing surface of the rotary table 320 (the same as the "facing surface" in the first embodiment), a slider section 360 that moves on the reference rail 312, a movement mechanism 370 for moving the slider section 360 along the reference rail 312, and a standby rail 386 (see FIG. 8E) for causing the slider section 360 to standby at the time of unclamping.

The reference rails 312 are attached, on the mounting surface of the base 310, one each at a position corresponding to one of the long sides of the rotary table 320 positioned at the machining position MP (positions that are line-symmetrical across a straight line L passing through the center of the rotary shaft 322), in parallel to the long side.

On the other hand, regarding the following rails 324, two sets of following rails 324 are attached on the facing surface of the rotary table 320, the sets being near four corners on the diagonal lines of the rotary table 320.

Accordingly, as shown in FIG. 8B, four following rails 324 are disposed at the corners of the facing surface of the rotary table 320.

As described above, two reference rails 312 are attached to the base 310, and four following rails 324 are attached to the rotary table 320.

Moreover, the reference rails 312 and the following rails 324 are each parallel to the long side of the rotary table 320 positioned at the machining position MP, and the following rails 324 attached to the facing surface of the rotary table 320 are attached in such a way that, when the rotary table 320 is rotated 180 degrees, the following rails 324 are in parallel to and on the same straight line, when seen from above as shown in FIG. 8B, as the reference rails 312 attached to the mounting surface of the base 310.

As shown in FIGS. 8C and 8D, the slider section 360 is formed from a support section 362, a following slider 364 attached to the upper surface of the support section 362 (the surface facing the surface of the rotary table 320 where the following rails 324 are attached), and a reference slider 366 attached to the lower surface of the support section 362 (the surface facing the mounting surface of the base 310).

Furthermore, as shown in FIG. 8D, a wide head section 312a is formed at the upper end of the reference rail 312, and a wide head section 324a is formed at the lower end of the following rail 324.

Furthermore, as in the first embodiment, the reference slider 366 is formed to surround the head section 312a of the reference rail 312.

Moreover, as in the second embodiment, the following slider 364 is formed to surround the head section 324a of the following rail 324, and in a state where the following rail 324 is inserted in a recessed groove of the following slider 364, the following slider 364 is capable of freely sliding in the longitudinal direction of the following rail 324.

According to these structures, in a state where the following rail 324 is inserted in the recessed groove of the following slider 364, the following slider 364 is allowed to move along the following rail 324 without rocking in the left-right direction and the top-down direction in FIG. 8D. At this time, the following slider 364 also functions to fix the rotary table 320 to which the following rail 324 is attached, in the left-right direction and the top-down direction in FIG. 8D.

As in the case of the second embodiment, the movement mechanism 370 is configured by means having a drive section which is capable of linearly expanding and contracting, such as a hydraulic cylinder, and is disposed in parallel to the reference rail 312, at a position offset from the same straight line, as shown in FIGS. 8B to 8D.

Furthermore, the movement mechanism 370 includes an arm 372 which is capable of freely moving forward and backward with respect to the movement mechanism 370, and the arm 372 is attached to an attachment section 362a protruding sideways from the support section 362 of the slider section 360, and moves the slider section 360 forward and backward on the reference rail 312.

As shown in FIGS. 8B and 8E, the table clamp device 350 according to the third embodiment further includes the standby rail 386 for allowing the slider section 360 removed from the following rail 324 at the time of unclamping to stand by.

As shown in FIG. 8E, the standby rail 386 has its upper surface, in the drawing, attached to a rail support section 382, and as shown in FIG. 8B, the rail support section 382 is attached to a standby rail attachment section 380 via biasing means 384, such as a coil spring, in a manner capable of moving forward and backward.

Furthermore, the standby rail 386 has the same cross-sectional shape as the reference rail 312 or the following rail 324 shown in FIG. 8D, and as shown in FIG. 8B, the standby rail 386 is disposed on the same straight line as the following rail 324.

Moreover, as shown in FIG. 8E, the standby rail 386 is disposed in such a way that its head section is at the same height as the head section of the following rail 324.

According to such an arrangement, when the standby rail 386 and the following rail 324 are at positions on the same straight line, the following slider 364 of the slider section 360 is allowed to move between the standby rail 386 and the following rail 324 by sliding between the two.

The rail support section 382 is, seen from the side, an L-shaped member (see FIG. 9), and is structured such that the standby rail 386 is attached to one side, and a biasing force is constantly applied to the other side by the biasing means 384.

Moreover, when the slider section 360 is moved by the driving by the movement mechanism 370 in the direction of coming close to the movement mechanism 370, the rail support section 382 is pressed by a side surface of the slider section 360 and is moved in the opposite direction from the biasing force, and when the slider section 360 is moved in the direction of separating from the movement mechanism 370, the rail support section 382 is moved by the biasing force in the direction of separating from the standby rail attachment section 380, together with the slider section 360.

Figure 9A:
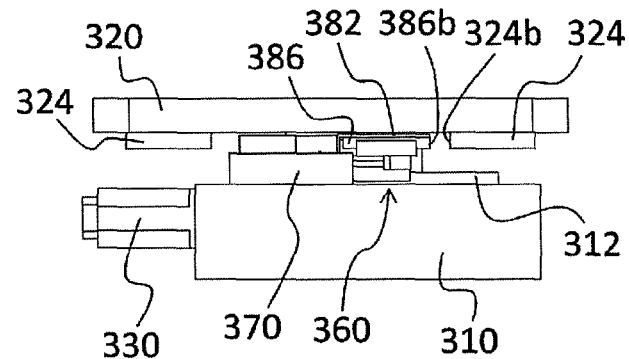
FIG. 9A is a side view showing an overview of a positioning and clamping operation of the pallet changer that uses the table clamp device according to the third embodiment of the present invention, and shows an unclamped state.
Figure 9B:
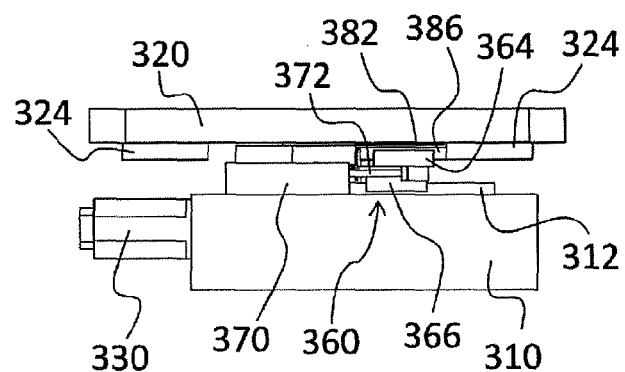
FIG. 9B is a side view showing an overview of the positioning and clamping operation of the pallet changer that uses the table clamp device according to the third embodiment of the present invention, and shows a state at the time of a following rail and a standby rail coming into contact with each other.
Figure 9C:
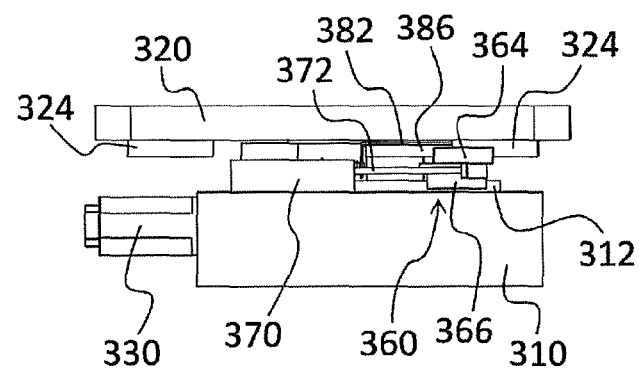
FIG. 9C is a side view showing an overview of the positioning and clamping operation of the pallet changer that uses the table clamp device according to the third embodiment of the present invention, and shows a clamped state.

FIG. 9 are side views showing an overview of a positioning and clamping operation of the pallet changer that uses the table clamp device according to the third embodiment of the present invention, and FIG. 9A shows an unclamped state, FIG. 9B shows a state at the time of the following rail and the standby rail coming into contact with each other, and FIG. 9C shows a clamped state.

With the table clamp device according to the third embodiment, a state as shown in FIG. 9A where the following rail 324 attached to the facing surface of the rotary table 320 and the following slider 364 of the slider section 360 are not coupled together is taken as an "unclamped" state, and a state as shown in FIG. 9C where the following rail 324 is inserted and coupled with the following slider 364 of the slider section 360 is taken as a "clamped" state.

In the unclamped state shown in FIG. 9A, the arm 372 of the movement mechanism 370 contracts and moves the slider section 360 in the direction of coming close to the movement mechanism 370. At this time, the following slider 364 of the slider section 360 is separated from the following rail 324 attached to the rotary table 320, and coupling between the two is released.

Moreover, the slider section 360 moves with its side surface on the arm 372 side abutted against the rail support section 382, and thus the standby rail 386 attached to the rail support section 382 also moves in the direction of coming close to the movement mechanism 370, and as a result, the following rail 324 and the standby rail 386 are positioned separate from each other.

Furthermore, when the rotation motor 330 is driven in this state, the rotary table 320 is allowed to rotate around the rotary shaft 322.

When the rotary table 320 is rotated, and the following rail 324 and the reference rail 312 reach positions that are on the same straight line when seen from above, driving of the rotation motor 330 is stopped, and rotating of the rotary table 320 is stopped.

The arm 372 of the movement mechanism 370 is extended in this state, and the slider section 360 is moved in the direction of separating from the movement mechanism 370. Then, the following slider 364 of the slider section 360 moves toward the facing following rail 324 along the standby rail 386, and the rail support section 382 also moves toward the following rail 324 under the biasing force from the biasing means 384.

Then, when a tip end 386b of the standby rail 386 attached to the rail support section 382 abuts an end section 324b of the following rail 324, the rail support section 382 receiving the biasing force stops moving, and a continuous rail is formed by the standby rail 386 and the following rail 324.

Subsequently, when the movement mechanism 370 is driven, and the slider section 360 is further moved in the direction of separating from the movement mechanism 370, the following slider 364 of the slider section 360 moves from the standby rail 386 to the following rail 324 side, as shown in FIG. 9C, and the following rail 324 is inserted into a recessed groove of the following slider 364, and a coupled state is achieved.

When the following slider 364 of the slider section 360 and the following rail 324 attached to the rotary table 320 are coupled as shown in FIG. 9C, the slider section 360 is engaged with the reference rail 312 via the reference slider 366 without rocking in the left-right direction as in the case of the second embodiment, and thus the base 310 and the rotary table 320 are positioned with respect to the rotating direction of the rotary table 320.

Furthermore, the positions of the rotary table 320 and the slider section 360, and the base 310 and the slider section 360 are fixed in the top-down direction, and as a result, the base 310 and the rotary table 320 are clamped in the top-down direction.

As described above, according to the table clamp device 350 according to the third embodiment of the present invention shown in FIGS. 8 and 9, as in the case of the first and the second embodiments, the structures of a rotary mechanism of the rotary table 320 and a positioning/clamping mechanism of the rotary table 320 may be simplified, and also the time necessary for positioning and clamping of the base 310 and the rotary table 320 may be reduced.

Furthermore, in addition to the effect described in the second embodiment, the following slider 364 of the slider section 360 whose coupling with the following rail 324 is released at the time of unclamping is positioned at the standby rail 386 which is displaced according to the movement of the slider section 360, and thus the recessed groove of the following slider 364 is prevented from being exposed and from having its sliding surface to the following rail 324 polluted.

Fourth Embodiment

Next, an overview of a table clamp device according to a fourth embodiment of the present invention will be described with reference to FIGS. 10 and 11.

A mode of realizing coupling between a rotary table and a slider section by a following rail and a following slider is described with respect to the table clamp device according to the second embodiment, but with respect to a table clamp device according to the fourth embodiment, a case where a reference rail and a following rail are continuously connected, and where positioning and clamping are performed by a reference slider of a slider section coupling also with the following rail will be described.

Additionally, also in the fourth embodiment, a machine tool to which the table clamp device and the pallet changer are applied is the same as the one described in the first embodiment and shown in FIG. 1, and repeated description thereof is omitted.

Figure 10A:
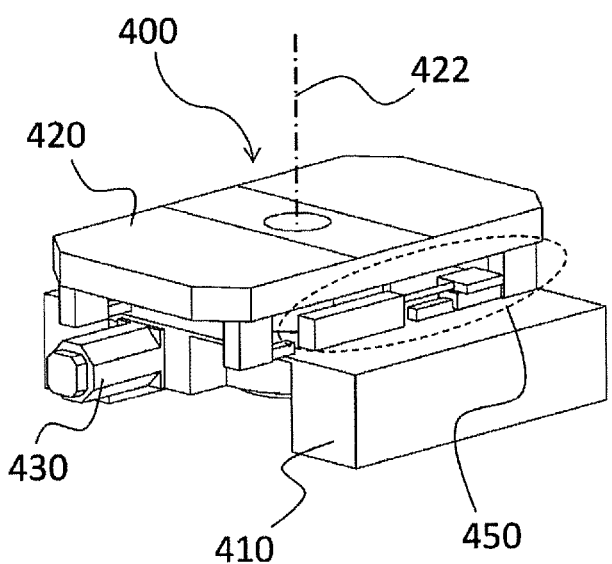
FIG. 10A is a diagram showing an overview of a pallet changer that uses a table clamp device according to a fourth embodiment of the present invention, and shows a perspective view of the entire pallet changer.
Figure 10B:
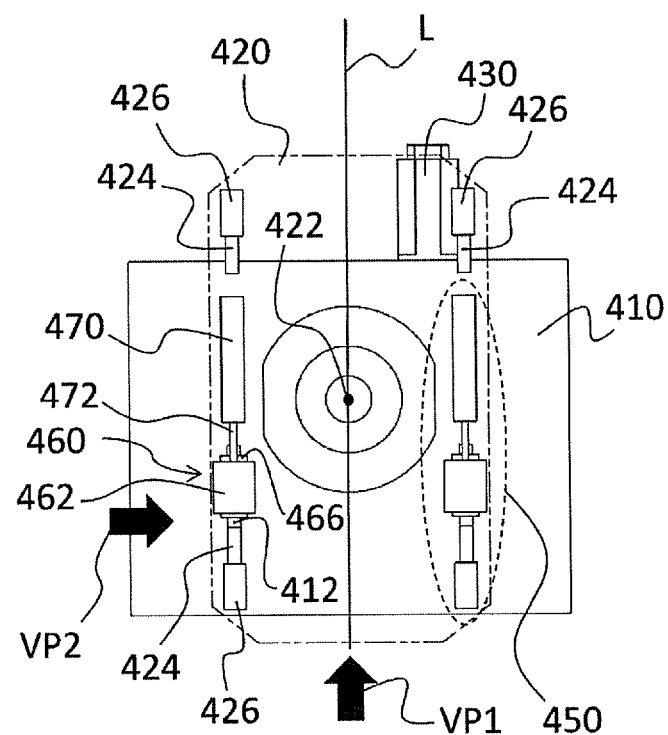
FIG. 10B is a diagram showing an overview of the pallet changer that uses the table clamp device according to the fourth embodiment of the present invention, and shows a top view of the pallet changer.
Figure 10C:
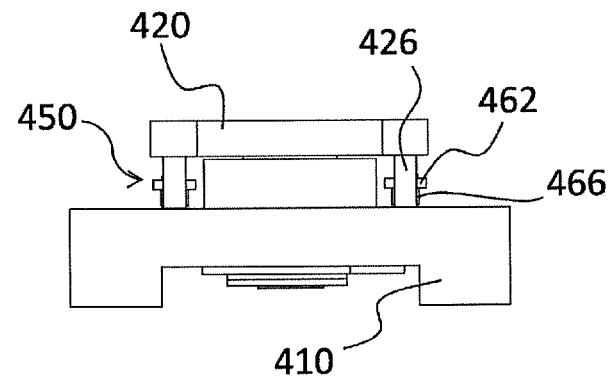
FIG. 10C is a diagram showing an overview of the pallet changer that uses the table clamp device according to the fourth embodiment of the present invention, and shows a side view of the pallet changer seen from the direction of an arrow VP1 in FIG. 10B.
Figure 10D:
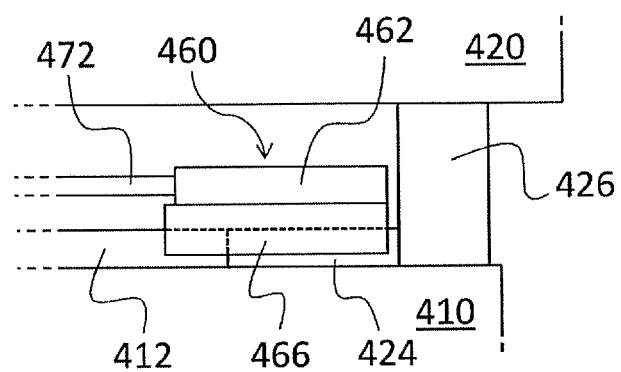
FIG. 10D is a diagram showing an overview of the pallet changer that uses the table clamp device according to the fourth embodiment of the present invention, and shows a side view of main parts of the table clamp device seen from the direction of an arrow VP2 in FIG. 10B.

FIG. 10 are diagrams showing an overview of a pallet changer that uses a table clamp device according to the fourth embodiment of the present invention, and FIG. 10A shows a perspective view of the entire pallet changer, FIG. 10B shows a top view of the pallet changer, FIG. 10C shows a side view of the pallet changer seen from the direction of an arrow VP1 in FIG. 10B, and FIG. 10D shows a side view of main parts of the table clamp device seen from the direction of an arrow VP2 in FIG. 10B.

Additionally, also in FIG. 10B, the rotary table is shown by a two-dot chain line, and an overview of the table clamp device seen through the rotary table from above is shown together.

As shown in FIG. 10A, a pallet changer 400 that uses the table clamp device according to the fourth embodiment of the present invention includes a base 410, a rotary table 420 that rotates around a rotary shaft 422, a rotation motor 430, and table clamp devices 450 for positioning and clamping the rotary table 420 with respect to the base 410.

Additionally, with the pallet changer 400 according to the fourth embodiment, the structures of the base 410, the rotary table 420, the rotary shaft 422, the rotation motor 430, and the mechanism for rotating the rotary table 420 are the same as those of the first embodiment shown in FIG. 2, and repeated description thereof is omitted.

As shown in FIGS. 10B and 10C, the pallet changer 400 according to the fourth embodiment includes, as in the case of the first embodiment, the table clamp devices 450 at positions that are line-symmetrical across a straight line L that is parallel to the long side of the rotary table 420 and that passes through the center of the rotary shaft 422 on the base 410 (that is, near the long sides of the rotary table 420 positioned at the machining position MP).

The table clamp device 450 includes a reference rail 412 attached to a mounting surface of the base 410 (the same as the "mounting surface" in the first embodiment), following rails 424 attached to a facing surface of the rotary table 420 (the same as the "facing surface" in the first embodiment) by attachment arms 426, a slider section 460 that moves on the reference rails 412, and a movement mechanism 470 for moving the slider section 460 along the reference rails 412.

The reference rails 412 are attached, on the mounting surface of the base 410, one each at a position corresponding to one of the long sides of the rotary table 420 positioned at the machining position MP (positions that are line-symmetrical across the straight line L passing through the center of the rotary shaft 422), in parallel to the long side.

On the other hand, four attachment arms 426 are provided on the facing surface of the rotary table 420, near four corners on the diagonal lines of the rotary table 420, the arms protruding toward the base 410, and two sets of following rails 424 are attached to the four attachment arms 426 while being parallel to the long side of the rotary table 420 and in a facing manner.

Furthermore, as shown in FIG. 10D, the protruding length of the attachment arm 426 is set to be approximately the same as the distance between the base 410 and the rotary table 420, and the following rail 424 is attached at a position at the same height as the reference rail 412.

According to such a structure, the reference rails 412 and the following rails 424 are each attached in parallel to the long side of the rotary table 420 positioned at the machining position MP, and when the rotary table 420 is rotated 180 degrees, the following rails 424 attached to the attachment arms 426 protruding from the facing surface of the rotary table 420 are disposed on the straight line as the reference rails 412 attached to the mounting surface of the base 410.

As shown in FIG. 10D, the slider section 460 is formed from a support section 462, and a reference slider 466 attached to the lower surface of the support section 462 (the surface facing the mounting surface of the base 410).

Furthermore, as in the third embodiment, wide head sections are formed at the upper ends of the reference rail 412 and the following rail 424, and the reference slider 466 is formed to surround a head section 412a of the reference rail 412 while being astride in a manner capable of freely sliding in the longitudinal direction of the reference rail 412.

As in the case of the first embodiment, the movement mechanism 470 is configured by means having a drive section which is capable of linearly expanding and contracting, such as a hydraulic cylinder, and is disposed on the same straight line as the reference rail 412 and the following rail 424, as shown in FIG. 10A or 10B.

Furthermore, the movement mechanism 470 includes an arm 472 which is capable of freely moving forward and backward with respect to the movement mechanism 470, and the arm 472 is attached to the support section 462 of the slider section 460, and moves the slider section 460 forward and backward on the reference rail 412 and the following rail 424 on the same straight line.

According to these structures, in a state where the reference rail 412 and the following rail 424 are inserted in the recessed groove of the reference slider 466, the slider section 460 is allowed to move along the reference rail 412 and the following rail 424 in a freely sliding manner without rocking in the left-right direction and the top-down direction in FIG. 10C.

At this time, the reference slider 466 also functions to fix the rotary table 420 to which the following rail 424 is attached, in the left-right direction and the top-down direction in FIG. 10C.

Figure 11A:
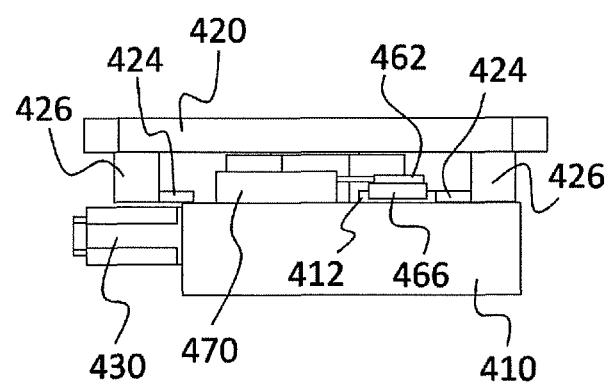
FIG. 11A is a side view showing an overview of a positioning and clamping operation of the pallet changer that uses the table clamp device according to the fourth embodiment of the present invention, and shows an unclamped state.
Figure 11B:
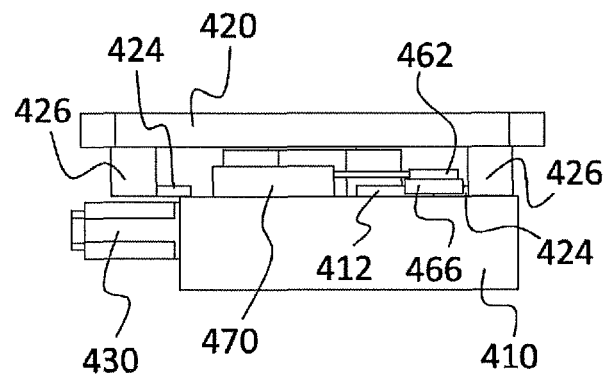
FIG. 11B is a side view showing an overview of the positioning and clamping operation of the pallet changer that uses the table clamp device according to the fourth embodiment of the present invention, and shows a clamped state.

FIG. 11 are side views showing an overview of a positioning and clamping operation of the pallet changer that uses the table clamp device according to the fourth embodiment of the present invention, and FIG. 11A shows an unclamped state, and FIG. 11B shows a clamped state.

With the table clamp device according to the fourth embodiment, a state as shown in FIG. 11A where the following rail 424 attached to the attachment arm 426 protruding from the facing surface of the rotary table 420 and the reference slider 466 of the slider section 460 are not coupled together is taken as an "unclamped" state, and a state as shown in FIG. 11B where the following rail 424 is inserted and coupled with the reference slider 466 of the slider section 460 is taken as a "clamped" state.

In the unclamped state shown in FIG. 11A, the arm 472 of the movement mechanism 470 contracts and moves the slider section 460 in the direction of coming close to the movement mechanism 470. At this time, the reference slider 466 of the slider section 460 is separated from the following rail 424 attached to the attachment arm 426 protruding from the rotary table 420, and coupling between the two is released.

Furthermore, when the rotation motor 430 is driven in this state, the rotary table 420 is allowed to rotate around the rotary shaft 422.

When the rotary table 420 is rotated, and the following rail 424 and the reference rail 412 reach positions that are on the same straight line when seen from above, driving of the rotation motor 430 is stopped, and rotating of the rotary table 420 is stopped.

The arm 472 of the movement mechanism 470 is extended in this state, and the slider section 460 is moved in the direction of separating from the movement mechanism 470. Then, the reference slider 466 of the slider section 460 moves toward the following rail 424 that is continuous with the reference rail 412, and the following rail 424 is inserted into the recessed groove of the reference slider 466 and a coupled state is achieved.

As shown in FIG. 11B, when the reference slider 466 of the slider section 460 and the following rail 424 attached to the attachment arm 426 protruding from the rotary table 420 are coupled, the rotary table 420 and the slider section 460 integrally move in the rotation direction of the rotary table 420 by the reference slider 466 and the following rail 424.

As described above, the reference slider 466 of the slider section 460 engages with the following rail 424 without rocking in the left-right direction, and as a result, the rotary table 420 and the base 410 are positioned with respect to the rotation direction of the rotary table 420.

Furthermore, when the following rail 424 attached to the attachment arm 426 protruding from the rotary table 420 is inserted and coupled with the reference slider 466 of the slider section 460, the positions of the rotary table 420 and the slider section 460 are fixed with respect to the top-down direction.

Accordingly, when the following rail 424 attached to the attachment arm 426 protruding from the rotary table 420 and the reference slider 466 of the slider section 460 are coupled together, the base 410 and the rotary table 420 are positioned in the rotation direction and are clamped in the top-down direction.

As described above, according to the table clamp device 450 according to the fourth embodiment of the present invention shown in FIGS. 10 and 11, as in the case of the first to the third embodiments, the structures of a rotary mechanism of the rotary table 420 and a positioning/clamping mechanism of the rotary table 420 may be simplified, and also the time necessary for positioning and clamping of the base 410 and the rotary table 420 may be reduced.

Furthermore, in addition to the effects described in the second and the third embodiments, the reference slider 466 of the slider section 460 functions in the same manner as the following slider 264 or 364 of the second or the third embodiment, for example, by the following rail 424 being attached to the attachment arm 426 protruding from the rotary table 420 and forming a continuous rail with the reference rail 412, and thus the structure of the slider section 460 may be further simplified, and also the weight of the table clamp device 450 may be reduced.

Additionally, the present invention is not limited to the structures according to the embodiments described above, and may include various example modifications.

For example, cases have been described with respect to the table clamp devices according to the first to the fourth embodiments where a hydraulic cylinder is used as the movement mechanism, but other means such as a rack/pinion mechanism or a linear guide mechanism may also be adopted as long as the means has a drive section which is capable of linearly expanding and contracting.

Furthermore, in the third embodiment, a case is described where a coil spring is used as the biasing means for applying a biasing force on the rail support section to which the standby rail is attached, but an elastic body such as rubber, a piston mechanism or the like may also be used as long as the slider section is capable of contracting (to have its length shortened) when moving toward the movement mechanism, and biasing force may be exerted by the slider section extending at the time of moving away from the movement mechanism, as described above.

Furthermore, in the first to the fourth embodiments, cases are described where, when seen in cross-section, the reference rails, the following rails and the standby rail have head sections, but any structure may be adopted, such as a structure where a rolling element is interposed between the rail and the slider, as long as a sliding relationship may be formed between the rail and the slider, and a function of preventing falling out in the top-down direction may be achieved.

Moreover, the numbers of disposed table clamp devices described in the first to the fourth embodiments are only examples, and embodiments may be combined or changes may be made in such a way that, for example, four table clamp devices are disposed in the first and the third embodiments, or two table clamp devices are disposed in the second embodiment.

In the first to the fourth embodiments, pallet changers that are based on a positional relationship according to which the machining position and the setup position face each other at 180 degrees are described, but the pallet changer may be structured in such a way that there are several machining positions or setup positions at angles equally dividing the rotary table, such as 60 degrees or 90 degrees.

Moreover, with respect to the pallet changers according to the first to the fourth embodiments, a case is described where the rotary table rotates on a horizontal rotation surface around a rotary shaft perpendicular to the base, but the table clamp devices according to the present invention may be used even if the rotation surface is not horizontal, as long as the reference rails are disposed in parallel to the rotation surface.

A table clamp device, according to the embodiment of the present invention, for positioning and clamping a rotary table that rotates between a plurality of positions at a predetermined position with respect to a base that supports the rotary table in a manner capable of rotating includes a reference rail provided on a mounting surface of the base, a slider section provided to slide along the reference rail, and a movement mechanism to move the slider section along the reference rail, where the rotary table is positioned and clamped to the base by the slider section by engagement of the slider section with a part of the rotary table.

According to the embodiment of the present invention, the part of the rotary table is a following rail that is attached to the rotary table.

Here, the following rail may be attached to the rotary table, on a surface facing the mounting surface of the base, and the slider section may include a reference slider that engages with the reference rail, a following slider that engages with the following rail, and a support section for supporting the reference slider and the following slider.

Furthermore, the base may further include a standby rail attachment section on the mounting surface, a standby rail that engages with the following slider may be attached to the standby rail attachment section by a rail support section for supporting the standby rail, and the standby rail may abut against the following rail to form a continuous rail.

Here, the standby rail moves between a first position of abutting against the following rail and a second position separate from the following rail, and the standby rail attachment section further includes biasing means (for example, a coil spring) for constantly biasing the rail support section in a direction from the second position to the first position.

Also, the following rail may be attached to the rotary table by an attachment arm in such a way as to be disposed, at the predetermined position, on a same straight line as the reference rail.

The table clamp device according to the embodiment of the present invention may be applied to a pallet changer including a rotary table that rotates between a plurality of positions, a base including a rotary shaft for rotating the rotary table, and a driver for rotating the rotary table.

Here, the pallet changer may have one or a plurality of the table clamp devices disposed.

Here, reference rails of the table clamp devices may be disposed at positions that are line-symmetrical with respect to a straight line passing through the rotary shaft, or may be radially disposed in a rotating radial direction from the rotary shaft.

According to the embodiment of the present invention, due to the structures described above, the structures of a rotary mechanism of the rotary table and a positioning/clamping mechanism of the rotary table may be simplified, and also the time necessary for positioning and clamping of the rotary table may be reduced.

Also, according to the structure in which coupling of the base and the rotary table is performed by the following rail attached to the lower surface of the rotary table and the following slider of the slider section, highly accurate positioning, in the rotation direction, of the rotary table with respect to the base may be realized, and also the contact at the coupling part is increased, and coupling between the base and the rotary table may be made strong.

Furthermore, by causing the following slider of the slider section whose coupling with the following rail is released at the time of unclamping to be positioned at the standby rail which is displaced according to the movement of the slider section, the recessed groove of the following slider may be prevented from being exposed and from having its sliding surface to the following rail polluted.

Moreover, according to the structure in which the following rail is attached to the attachment arm protruding from the rotary table, and a continuous rail is formed by the reference rail and the following rail, the reference slider of the slider section may also function as the following slider, and the structure of the slider section may further be simplified, and the weight of the entire table clamp device may be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A table clamp device for positioning and clamping a rotary table that rotates between a plurality of positions at a predetermined position with respect to a base that supports the rotary table in a manner capable of rotating, the table clamp device comprising:
a reference rail provided on a mounting surface of the base;
a slider section provided to slide along the reference rail; and
a movement mechanism to move the slider section along the reference rail,
wherein the rotary table is positioned and clamped to the base by the slider section by engagement of the slider section with a part of the rotary table.

2. The table clamp device according to claim 1, wherein the part of the rotary table is a following rail that is attached to the rotary table.

3. The table clamp device according to claim 2, wherein the following rail is attached to the rotary table, on a surface facing the mounting surface of the base.

4. The table clamp device according to claim 3, wherein the slider section includes a reference slider that engages with the reference rail, a following slider that engages with the following rail, and a support section for supporting the reference slider and the following slider.

5. The table clamp device according to claim 4,
wherein the base further includes a standby rail attachment section on the mounting surface,
wherein a standby rail that engages with the following slider is attached to the standby rail attachment section by a rail support section for supporting the standby rail, and
wherein the standby rail abuts against the following rail to form a continuous rail.

6. The table clamp device according to claim 5,
wherein the standby rail moves between a first position of abutting against the following rail and a second position separate from the following rail, and
wherein the standby rail attachment section further includes biasing means for constantly biasing the rail support section in a direction from the second position to the first position.

7. The table clamp device according to claim 6, wherein the biasing means is a coil spring.

8. The table clamp device according to claim 2, wherein the following rail is attached to the rotary table by an attachment arm in such a way as to be disposed, at the predetermined position, on a same straight line as the reference rail.

9. A pallet changer comprising:
a rotary table that rotates between a plurality of positions;
a base including a rotary shaft for rotating the rotary table;
a table clamp device according to claim 1; and
a driver for rotating the rotary table.

10. The pallet changer according to claim 9, wherein a plurality of the table clamp devices are disposed.

11. The pallet changer according to claim 10, wherein reference rails of the table clamp devices are disposed at positions that are line-symmetrical with respect to a straight line passing through the rotary shaft.

12. The pallet changer according to claim 10, wherein reference rails of the table clamp devices are radially disposed in a rotating radial direction from the rotary shaft.

13. A pallet changer comprising:
a rotary table that rotates between a plurality of positions;
a base including a rotary shaft for rotating the rotary table;
a table clamp device according to claim 4; and
a driver for rotating the rotary table.

14. A table clamp device comprising:
a reference rail provided on a mounting surface of a base on which a rotary table is rotatably supported, the rotary table having a first engagement part;
a slider section provided to slide along the reference rail and having a second engagement part; and
a movement mechanism to move the slider section along the reference rail so that the second engagement part engages with the first engagement part such that the rotary table is positioned and clamped to the base.

15. A pallet changer comprising:
a rotary table having a first engagement part;
a driver to rotate the rotary table;
a base including a rotary shaft around which the rotary table rotates; and
a table clamp device comprising:
a reference rail provided on a mounting surface of the base;
a slider section provided to slide along the reference rail and having a second engagement part; and
a movement mechanism to move the slider section along the reference rail so that the second engagement part engages with the first engagement part such that the rotary table is positioned and clamped to the base.

\* \* \* \* \*